US009031861B1

(12) United States Patent
Liu et al.

(10) Patent No.: US 9,031,861 B1
(45) Date of Patent: May 12, 2015

(54) MEASURING CONTENT ITEM EFFECTIVENESS

(75) Inventors: Lili Liu, Morgan Hill, CA (US); Chao Cai, San Jose, CA (US); Paul Liu, Oakland, CA (US); Sissie Ling-le Hsiao, Santa Clara, CA (US); Karl Pfleger, San Francisco, CA (US)

(73) Assignee: Google Inc., Mountain View, CA (US)

( * ) Notice: Subject to any disclaimer, the term of this patent is extended or adjusted under 35 U.S.C. 154(b) by 346 days.

(21) Appl. No.: 13/242,772

(22) Filed: Sep. 23, 2011

(51) Int. Cl.
*G06Q 30/00* (2012.01)
*G06Q 30/02* (2012.01)

(52) U.S. Cl.
CPC .................................. *G06Q 30/0205* (2013.01)

(58) Field of Classification Search
USPC ........................................................ 705/14.41
See application file for complete search history.

(56) References Cited

U.S. PATENT DOCUMENTS

| 2006/0271671 | A1* | 11/2006 | Hansen | 709/224 |
| 2007/0208616 | A1* | 9/2007 | Choi | 705/14 |
| 2011/0313814 | A1* | 12/2011 | Briggs | 705/7.31 |

* cited by examiner

*Primary Examiner* — Thomas M Hammond, III
*Assistant Examiner* — Katherine Kolosowski-Gager
(74) *Attorney, Agent, or Firm* — Fish & Richardson P.C.

(57) ABSTRACT

Methods, systems, and computer program products are provided for measuring effectiveness of content items included in a campaign. One example method includes providing a corpus of campaigns, where a campaign defines parameters for presentation that specify circumstances under which content items are presented to users in response to requests. The corpus is filtered by identifying one or more candidate campaigns, where each of the identified candidate campaigns is associated with a geographic region and includes one or more constraints that permit pausing distribution of content items without compromising campaign goals. For each candidate campaign, one or more experimental geographic locations included in the geographic region are determined that are substantially representative of the region. Presentation of at least one of the content items is paused for a time period, and content item effectiveness is measured by comparing resource conversions for experimental and control geographic locations.

23 Claims, 5 Drawing Sheets

MEASURING CONTENT ITEM EFFECTIVENESS

BACKGROUND

This specification generally relates to information presentation.

Organizations and individuals can distribute information and advertising to users over the Internet, with the purpose of driving user traffic to their websites. Statistics regarding website traffic can be provided to the organizations and individuals, including information about referring websites.

SUMMARY

In general, one innovative aspect of the subject matter described in this specification may be embodied in methods, systems, and computer program products for measuring effectiveness of content items included in a campaign. One example method includes providing a corpus of campaigns, each campaign associated with at least one content item. Content items can include links to resources and can be associated with content item sponsors. A campaign can define parameters for presentation that specify circumstances under which at least one content item is presented to users in response to received content item requests. The corpus of campaigns can be filtered by identifying one or more candidate campaigns in the corpus, where each of the identified candidate campaigns is associated with a geographic region and includes one or more constraints that permit pausing distribution of the content item in the campaign in a portion of the geographic region without compromising campaign goals. For each of the identified candidate campaigns, one or more geographic locations that are included in the geographic region can be determined, the geographic locations being substantially representative of the geographic region. Presentation of at least one content item in the geographic locations can be paused for a time period, and content item effectiveness of the content item during the time period can be measured.

In general, another innovative aspect of the subject matter described in this specification may be embodied in a method that includes identifying a content item to be presented to users in response to requests for content, the content item including a link to a resource and being part of a campaign associated with a content item sponsor, the campaign being associated with a geographic region comprising a plurality of different geographic locations. One or more of the plurality of different geographic locations are selected to be experimental geographic locations. One or more of the plurality of different geographic locations are selected to be control geographic locations. Presentation of the content item is paused in the one or more experimental geographic locations for a time period, while continuing presentation of the content item in the one or more control geographic locations. Effectiveness of the content item is measured, including comparing conversions associated with the resource during the time period for the one or more experimental geographic locations and conversions associated with the resource during the time period for the one or more control geographic locations.

In general, another innovative aspect of the subject matter described in this specification may be embodied in a method that includes identifying a content item for presentation to users in response to requests for content, the content item including a link to a resource and being part of a campaign associated with a content item sponsor, the campaign being associated with a geographic region, the geographic region including one or more geographic locations. At least one of the one or more geographic locations is selected. Presentation of the content item is paused in the selected geographic location during a first time period. The content item is presented in the selected geographic location during a second different time period. Effectiveness of the content item is measured including comparing conversions associated with the resource during the first time period and conversions associated with the resource during the second different time period in the selected one or more geographic locations.

In general, another innovative aspect of the subject matter described in this specification may be embodied in a computer program product that can perform operations including identifying a content item to be presented to users in response to requests for content, the content item including a link to a resource and being part of a campaign associated with a content item sponsor, the campaign being associated with a geographic region comprising a plurality of different geographic locations. One or more of the plurality of different geographic locations are selected to be experimental geographic locations. One or more of the plurality of different geographic locations are selected to be control geographic locations. Presentation of the content item is paused in the one or more experimental geographic locations for a time period, while continuing presentation of the content item in the one or more control geographic locations. Effectiveness of the content item is measured, including comparing conversions associated with the resource during the time period for the one or more experimental geographic locations and conversions associated with the resource during the time period for the one or more control geographic locations.

In general, another innovative aspect of the subject matter described in this specification may be embodied campaign evaluation systems for providing content item effectiveness information to sponsors. The campaign evaluation systems can include campaign filterers, content item identifiers, experiment controllers, campaign information providers. A campaign filterer can identify one or more campaigns for running a controlled experiment of content item effectiveness. An experiment controller can identify content items for presentation to users in response to requests for content. An experiment controller can determine geographic locations for pausing presentation of content items, can pause presentation of content items in the geographic locations for periods of time, and can measure content item effectiveness of content items. A campaign information provider can aggregate and provide content item effectiveness information to content item sponsors.

These and other embodiments may each optionally include none, one or more of the following features. In various examples the content item can be an advertisement. The resource can be a web page. Measuring content item effectiveness can relate to a hypothetical attribution model that estimates the contributions of impressions of the content item toward conversions associated with the resource. Measuring content item effectiveness can relate to measuring an effect of a first content item on conversions associated with the resource attributed to a second content item. The experimental geographic locations and the control geographic locations can be partitioned from the geographic region such that a majority of users within a particular location spends a majority of their online time within the particular location. The experimental geographic locations can be selected based at least in part on being substantially representative of the geographic region. An alternative content item can be presented.

Content item effectiveness information can be presented to the content item sponsor, based at least in part on the measuring.

Filtering the corpus can include filtering out campaigns that do not have a relatively uniform distribution over the geographic region. Measuring content item effectiveness can include comparing a measure of effectiveness of the content item during the time period for one or more paused and one or more unpaused geographic locations. At least one content item can be presented in a second different time period and measuring content item effectiveness can include comparing a measure of effectiveness of the content item during the first time period and a measure of effectiveness of the content item during the second different time period. Pausing presentation of the content item can be cycled over different geographic locations for the campaign over time.

A number of geographic locations determined for pausing presentation of the content item can be proportional to a budget constraint of the candidate campaign. One or more of the constraints can relates to a number of impressions and the campaign goals can relate to delivering the number of impressions in the geographic region. Content item effectiveness information can be provided to the sponsor of the content item, based at least in part on the measuring.

Particular embodiments of the subject matter described in this specification may be implemented to realize none, one or more of the following advantages. Pausing presentation of a content item in a small set of geo areas can pose minimal impact on the overall performance and budget of a campaign. Running ad pausing experiments over an extensive time period and with large numbers of campaigns can provide statistically significant data for validating attribution theories and can provide quantitative figures for determining effectiveness for various types of content such as keyword, display, text, image, and mobile content. Effectiveness of and interrelations between various content item types can be identified.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

In general, computer systems can measure effectiveness of content (e.g., text, images, audio, video, advertisements, etc.) included in a campaign (e.g., an advertising campaign). By running a controlled experiment where presentation of a content item to a group of content consumers is paused, for example, effectiveness of the content item in regard to an overall campaign can be measured. By conducting experiments over extensive time periods with a large number of campaigns, statistically significant data can be provided for validating hypothetical attribution models and for determining effectiveness of various types of content, such as keyword, display, text, image, and mobile content. For campaigns including multiple content types, for example, the effectiveness of and the interrelationships between the content types can be identified. For example, an unclicked advertisement may be identified as otherwise contributing to the effectiveness of an overall campaign.

The systems discussed here may provide one or more mechanisms for collecting information about users. Users may be provided with an opportunity to opt in/out of programs that may collect personalized information. In addition, certain data may be anonymized in one or more ways before it is stored or used, so that personally identifiable data is removed.

Figure 1:
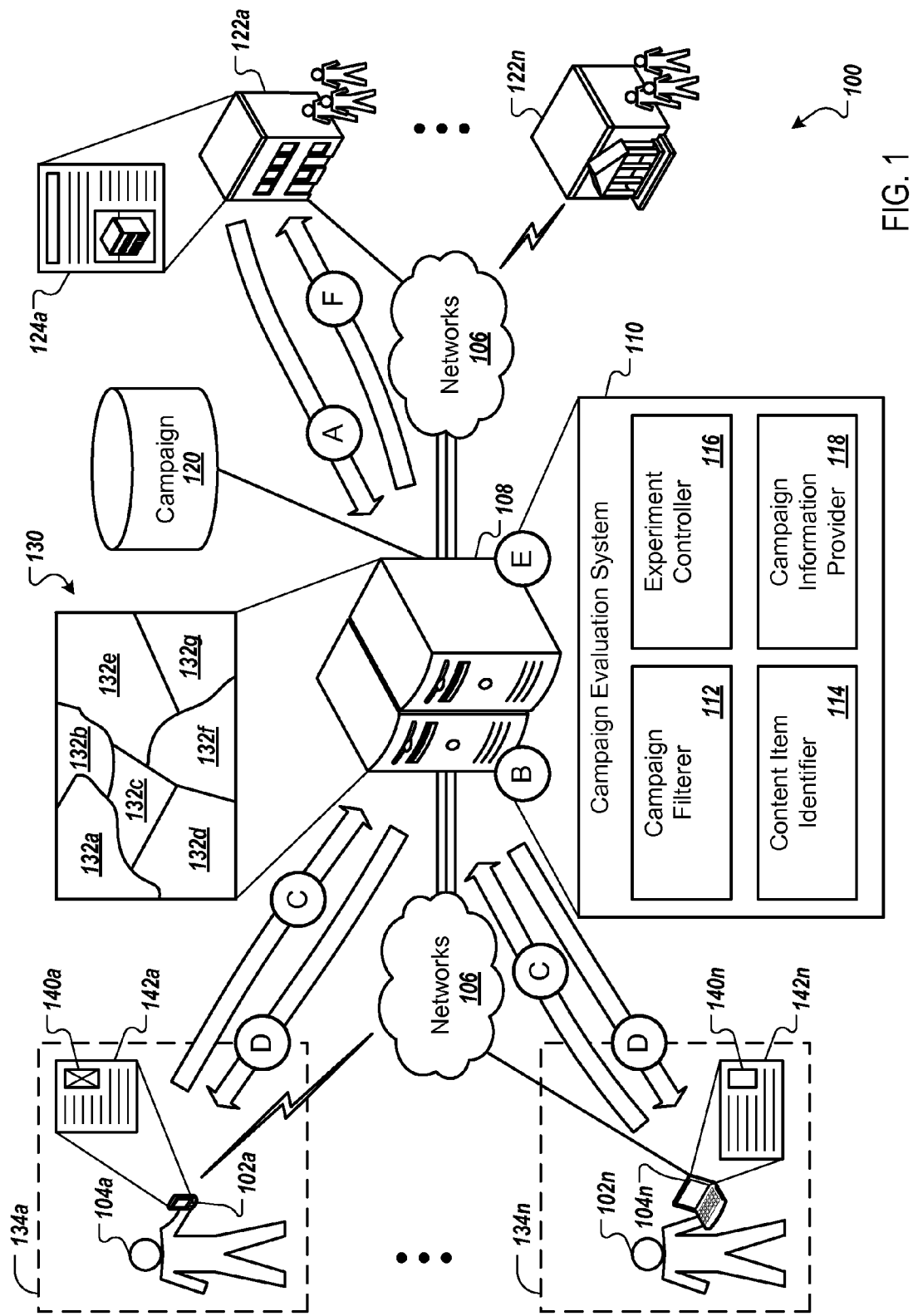
FIG. 1 is a diagram of an example system that can measure content item effectiveness.

FIG. 1 is a diagram of an example system 100 that can measure content item effectiveness. FIG. 1 also illustrates an example flow of data within the system 100 during states (A) to (F), where the states (A) to (F) may occur in the illustrated sequence, or they may occur in a sequence that is different than in the illustrated sequence.

In further detail, the system includes one or more client computing devices 102 (each operated by a corresponding user 104) that communicate over one or more networks 106 with one or more computing servers 108. The networks 106 may include a wireless cellular network, a wireless local area network (WLAN) or WiFi network, a Third Generation (3G) or Fourth Generation (4G) mobile telecommunications network, the Internet, or any other suitable network or any appropriate combination thereof.

The client device(s) 102 may be any suitable type of computing device (e.g., mobile phone, smart phone, personal digital assistant (PDA), tablet computer, laptop or desktop computer, or other stationary or portable device) that includes one or more processors and computer readable media. Among other components, for example, the client device(s) 102 includes one or more processors, computer readable media that store software applications, input device(s) (e.g., touch screens, keyboards, computer mice, motion sensors, microphones, and the like), output device(s) (e.g., display screens, speakers, and the like), and communications interfaces.

The computing server(s) 108 may be configured to execute application code associated with a variety of software components (e.g., modules, objects, libraries, services, and the like), including computer instructions to perform some or all of the method steps described below. In some implementations, the computing server(s) 108 may include one or more components of a campaign evaluation system 110 described below.

The campaign evaluation system 110 can measure content item effectiveness and can include a campaign filter 112, a content item identifier 114, an experiment controller 116, and a campaign information provider 118. Two or more of the components 112, 114, 116, and 118 may be implemented on the same device (e.g., same computing device), or on different devices, such as devices included in a server farm or a peer-to-peer network. The campaign evaluation system 110 and server(s) 108 can be in communication with one or more data storage devices, including a campaign data store 120. The campaign data store 120 can implement databases, file systems, and the like to add, remove, and maintain data used by the system 100.

Referring to the example flow of data, during state (A), one or more sponsors of content can provide information associated with one or more campaigns. For example, a content sponsor 122a can provide advertising campaign information such as one or more content items associated with a campaign, one or more resources (e.g., a web page resource 124a)

associated with the campaign and/or the content sponsor, campaign budget information, campaign timeline information, and campaign audience information (e.g., geographic region, demographics, etc.). Campaign information can be received by the computing servers 108 via networks 106, for example, and can be stored and maintained by the campaign data store 120.

During state (B), the corpus of campaigns received by the computing servers can be filtered, and one or more candidate campaigns can be identified for inclusion in a controlled experiment to determine content item effectiveness. For example, the campaign evaluation system 110 can use the campaign filter 112 to identify one or more candidate campaigns. Based on information stored and maintained by the campaign data store 120, for example, the campaign filter 112 can identify goals and constraints for each of the corpus of campaigns, such as goals and constraints related to a campaign's intended audience, geographic distribution, timeline, and budget. In the present example, the campaign filter 112 may identify a campaign of the content sponsor 122a as a suitable candidate for inclusion in an experiment. Evaluation criteria can be used to determine suitable campaigns for the experiment. Example evaluation criteria may include budget constraints, geo-segment distribution, campaign size, campaign timeline, intended campaign audience, and/or other suitable criteria.

During states (C) and (D), controlled experiments can be run for the candidate campaigns, including pausing presentation of content items in particular geographic locations. For example, the campaign evaluation system 110 can run a controlled experiment for the candidate campaign of the content sponsor 122a. In the present example, the content sponsor 122a may intend for one or more content items included in the campaign to be presented to users located in a geographic region 130, (e.g., one or more countries, states, metro areas, etc.) partitioned into geographic locations 132a-132g. The experiment controller 116, for example, can pause presentation of one or more of the content items to users 104 within one or more of the geographic locations 132a-132g, while continuing presentation of one or more of the content items to users 104 within other locations within the geographic region 130. Pausing presentation of content items, for example, may include not displaying content items to users 104. As another example, pausing presentation may include displaying alternate content items.

During state (C), user requests for content can be received. For example, each of the users 104a, 104n can employ client computing devices 102a, 102n to request content such as text, images, audio, video, maps, directions, search results, and other sorts of content. Each of the users 104a, 104n, can provide search queries or content requests to the computing server(s) 108, for example, and based on query keywords or other considerations, the campaign evaluation system 110 can use the content item identifier 114 to identify content (e.g., advertising content) to present in association with search results and/or content items. In the present example, one or more content items provided by the content sponsor 122a in association with the candidate campaign may be identified for presentation.

During state (D), content may be provided to users. For example, the experiment controller 116 can determine whether or not to provide a particular content item to a particular user, based at least in part on the location of the user and on the status of a particular experiment. User location, for example, may be determined by GPS (Global Positioning System) capabilities of the client computing devices 102, IP (Internet Protocol) addresses of the devices 102, location reporting of the users 104, or any other appropriate technique. Processes for collecting information related to user location may include options allowing users to opt in/out, and may include techniques for maintaining user privacy. For example, user data can be generalized, anonymized, and/or aggregated rather than being associated with particular users.

In the present example, the campaign evaluation system 110 may determine that the user 104a is at location 134a (e.g., within geographic location 132a), and that the user 104n is at location 134n (e.g., within geographic location 132b). Based on the status of an experiment including the candidate campaign, for example, the experiment controller 116 may determine that presentation of a particular content item is to be paused to users in the geographic location 132a, while being continued in other geographic locations within the geographic region 130. Thus, in the present example, the content item (e.g., content item 140n) may be provided to the client computing device 104n for presentation in association with search results (or other content) to the user 102n via an interface 142n. To the user 104a, for example, no content item or an alternate content item (e.g., content item 140a) may be provided to the client computing device 104a for presentation in association with search results via an interface 142a.

During state (E), content item effectiveness can be measured. For example, the experiment controller 116 can measure differences in overall user behavior between users in the geographic location 132a (i.e., the paused location) and users in other geographic locations 132b-132g within the geographic region 130. Measuring content effectiveness, for example, can include measuring conversions attributed to a particular content item (e.g., content item 140n) or a combination of content items associated with the resource 124a during the experiment, and can include measuring organic user interactions with the resource 124a (e.g., web page visits, item purchases, or other actions that may not be attributed to the content item 140n). A difference in the number, rate, and/or frequency of measured user interactions with the resource 124a identified during the experiment (e.g., a difference between all conversions and organic conversions), for example, can be used to determine a degree of lift associated with the content item 140n.

A conversion may be said to occur when a user performs a particular action related to a content item provided with a resource (e.g., a web page, a search results page, etc.). What constitutes a conversion may vary from case-to-case and can be determined in a variety of ways. For example, a conversion may occur when a user clicks on an advertisement, is referred to a web page, and consummates a purchase there before leaving that web page. A conversion can also be defined by an advertiser to be any measurable/observable user action, such as link click, downloading of a file (e.g., an application, a song, a white paper, etc.), navigating to at least a given depth of a website, viewing at least a certain number of web pages, spending at least a predetermined amount of time on a website or web page, registering on a website, or performing a social action regarding an advertisement, such as endorsing the advertisement or making some other preference designation.

During state (F), content item effectiveness information can be provided. For example, during and/or upon completion of the experiment, the campaign information provider 118 can provide information related to effectiveness of the content item 140n in regard to one or more campaigns of the content sponsor 122a. The content sponsor 122a can use such information, for example, to make informed campaign strategy decisions. In some implementations, information from multiple campaigns of multiple content sponsors can be aggregated for determining the effectiveness of various content types. For example, quantitative data can be provided for identifying overall average lift for displayed or related content, keywords, etc. As another example, hypothetical attribution models involving the relationship between various content types (e.g., display advertisements and content advertisements) and various campaign types (e.g., generic campaigns and branded campaigns) can be supported or disproven using aggregated effectiveness information.

Figure 2:
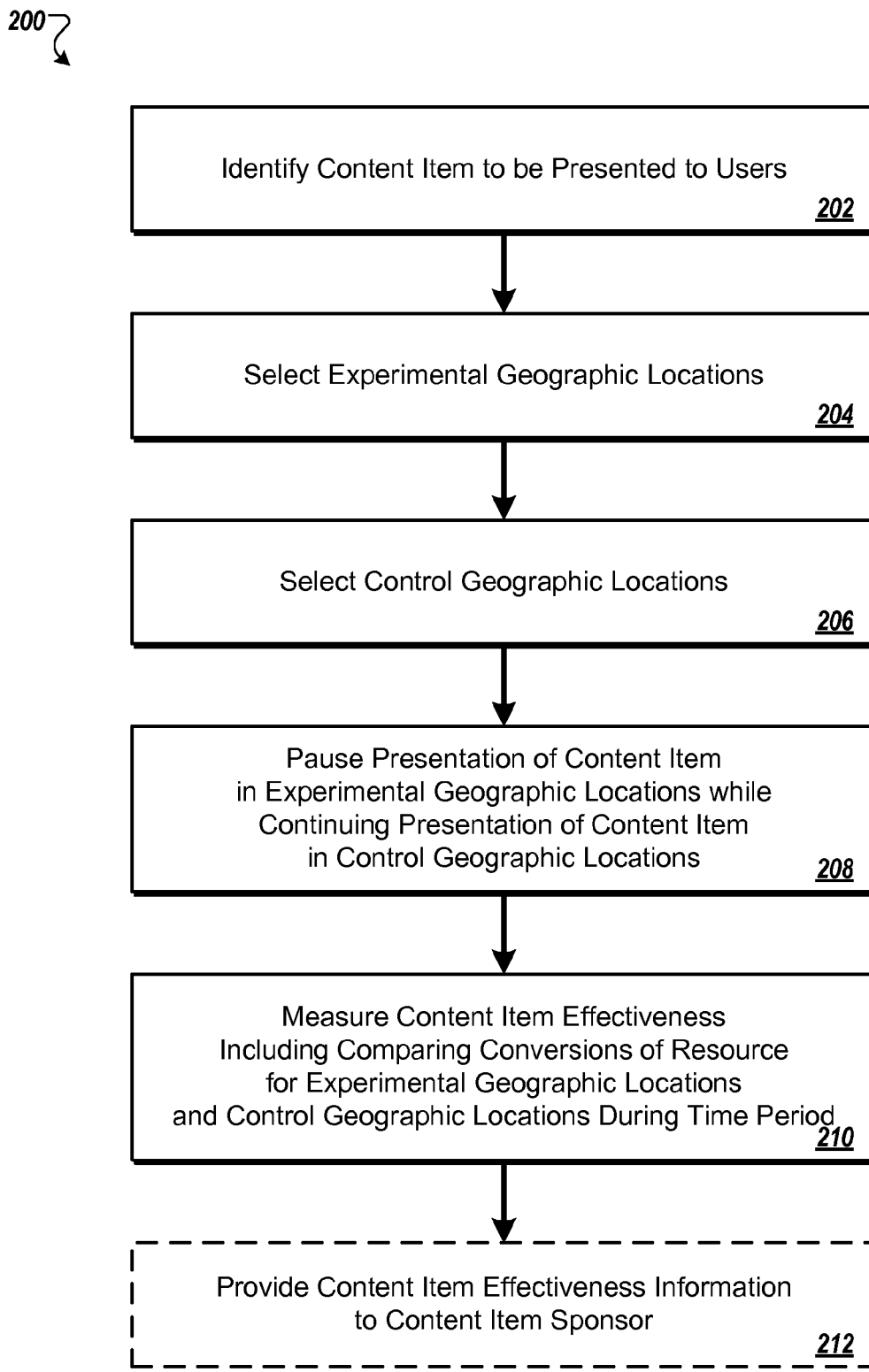
FIGS. 2-4 are flowcharts of example processes for measuring content item effectiveness.

FIG. 2 is a flowchart of an example process 200 for measuring content item effectiveness. In some implementations, the process 200 may be performed by the system 100 (shown in FIG. 1), and will be described as such for the purpose of clarity. Briefly, the process 200 can include identifying a content item for presentation to users, determining experimental geographic locations for pausing presentation of the content item, determining control geographic locations for continuing (or increasing) presentation of the content item, pausing presentation of the content item in experimental geographic locations, measuring content item effectiveness (including comparing effectiveness measures for experimental and control geographic locations during a time period), and optionally providing content effectiveness information to a content item sponsor.

A content item for presentation to users can be identified (202) in response to requests for content. For example, one or more users 104 can employ client computing devices 102 to request content (e.g., text, images, audio, video, maps, directions, search results, etc.) from the computing servers 108. The content item identifier 114, for example, can identify a content item (e.g., the content item 140$n$) for presentation to users 104 in response to content requests. The content item can be part of a campaign associated with a content item sponsor, and the campaign can be associated with a geographic region. For example, the content sponsor 122$a$ may sponsor a campaign including the content item 140$n$, and the campaign may be associated with the geographic region 130.

In some implementations, the content item may be an advertisement. For example, the content item may be a keyword advertisement for presentation in association with search results. As another example, the content item may be a display advertisement for presentation on a web page in association with other web content.

In some implementations, the content item may include a link to a resource. In general, campaigns (e.g., advertising campaigns) may include one or more content items (e.g., advertisements) which may include links to resources (e.g., web pages). For example, a campaign of the content sponsor 122$a$ can include the content item 140$n$ (e.g., an advertisement) which includes a link to web page resource 124$a$. The web page resource 124$a$ may be associated with the content sponsor 122$a$, for example, or with one or more of the sponsor's campaigns. For example, the resource 124$a$ may be a commercial portal for conducting transactions (e.g., purchases) of the users 104. Conversions (e.g., clicks, visits, transactions, etc.) of the resource 124$a$ by users 104 can be measured by the campaign evaluation system 110, for example, including attributing conversions to content items or content item types.

Geographic regions may be partitioned into multiple geographic locations. In general, geographic locations included in a geographic region may be sufficiently large such that a majority of users spend most of their on-line time in the same geographic location, but sufficiently numerous such that each geographic location includes a small fraction of the overall requests for content. For example, the geographic region 130 may be partitioned into geographic locations 132$a$-132$g$. In some implementations, geographic locations (e.g., the geographic locations 132$a$-132$g$) may be Designated Market Areas (DMAs). In some implementations, geographic locations may be metro areas.

One or more campaigns can be selected for a controlled experiment, based on evaluation criteria related to campaign characteristics such as budget, size, distribution, timeline, and audience. Suitable candidates for the experiment may be identified as having characteristics which, alone or in combination, enable conducting the experiment without compromising campaign goals. For example, the experiment controller 116 can access campaign information maintained by the campaign data store 120 to determine whether and to what degree a particular campaign may be constrained by budget, and to determine the campaign distribution. If the campaign is identified as having a budget constraint and a broad distribution, for example, provision (e.g., impressions) of one or more content items associated with the campaign can be paused to users in select locations while redistributing provision of the content item to other locations, within the bounds of campaign constraints.

One or more experimental geographic locations for pausing presentation of the content item can be selected (204). For example, the experiment controller 116 can determine that presentation of the content item 140$n$ is to be paused to users within experimental geographic location 132$a$. One or more control geographic locations for continuing presentation of the content item can be selected (206). For example, the experiment controller 116 can determine that presentation of the content item 140$n$ is to be continued to users within control geographic locations 132$b$-132$g$. Thus, in the present example, presentation of the content item can be paused within one or more of the geographic locations 132$a$-132$g$ within the geographic region 130 while continuing presentation of the content item within other locations.

In some implementations, selection of geographic locations for pausing and for continuing presentation of content items may be determined by automated processes for running a controlled experiment. For example, the experiment controller 116 can determine provision of the content item 140$n$ in various geographic locations 132$a$-132$g$ within the geographic region based on internal calculations and random assignments. As another example, content sponsors 122 can provide input indicating one or more geographic locations 132$a$-132$g$ for pausing and/or for continuing presentation of content items, and the experiment controller 116 can base selections for pausing and/or continuing at least in part on the input.

Presentation of the content item can be paused (208) in the one or more experimental geographic locations for a time period. For example, the experiment controller 116 can pause presentation of the content item 140$n$ to users 104 within the geographic location 132$a$ while continuing presentation of the content item to users within geographic locations 132$b$-132$g$. The time period, for example, may be determined by the experiment controller 116, the content sponsor 122$a$, and/or an administrator of the campaign evaluation system 110. For example, an experiment including a particular campaign may be run over the course of one or more days, weeks, or months. Overall experiments including multiple campaigns, for example, may be run over limited time periods or may be run perpetually, with various campaigns being added to and removed from the experiment over time. Multiple different time periods may be determined for pausing presentation of a content item, where each period may be the same or a different length and may include the same or different geographic areas where content presentation is restricted.

In some implementations, pausing presentation of content items can be based at least in part on one or more campaign constraints. For example, the experiment controller 116 can identify an intended number of impressions for the content item 140*n* as indicated by the content sponsor 122*a*. While pausing impressions of the content item 140*n* to users 104 within the geographic location 132*a*, for example, the experiment controller 116 can redistribute the paused impressions to users within the geographic locations 132*b*-132*g*. Thus, during the experiment, each of the geographic locations 132*b*-132*g* may receive a small proportion (e.g., less than five percent) of additional impressions while keeping the overall number of impressions included in the campaign within the number of impressions indicated by the content sponsor 122*a*.

In some implementations, pausing presentation of the content item may include not providing the content item for the time period. For example, rather than providing content item 140*n* to the client computing device 102*a* for presentation to the user 104*a* or to other users (e.g., when redistributing the content item to other areas), the computing servers 108 may provide no content or alternate content. As another example, the interface 142*a* (e.g., a web page) may filter provided content. For example, execution of the pausing experiment may be distributed among computing server and client devices.

In some implementations, pausing presentation of the content item may include presenting an alternative content item for a particular impression or over the specified time period. For example, rather than presenting content item 140*n* to the user 104*a*, the interface 142*a* may present an alternate content item 140*a*. Alternate content items may be associated with the content sponsor 122*a* or alternate content sponsors 122*n*, and may be selected, for example, randomly or based on predefined selection criteria.

Content item effectiveness can be measured (210), including comparing a measure of effectiveness of the content item during the time period for the one or more experimental geographic locations and for the one or more control geographic locations. For example, the experiment controller 116 can measure the number of conversions of the web page resource 124*a* within the geographic region 130 before, during, and after an experiment. In some implementations, measuring content item effectiveness may relate to a hypothetical attribution model that estimates the contributions of clicks or impressions of the content item toward conversions associated with the resource. By comparing organic conversions of the web page resource 124*a* within experimental geographic locations (e.g., geographic location 132*a*) by users who have not been exposed to the content item 140*n* during the time period, and conversions of the resource 124*a* within control geographic locations (e.g., control geographic locations 132*b*-132*g*) by users who may have been exposed to the content item 140*n*, for example, the experiment controller 116 can determine effectiveness of the content item 140*n*, and can create an attribution model to describe the interrelation between one or more historical presentations of the content item, current presentation of the content item, and the conversions.

In some implementations, for campaigns including multiple content items, effectiveness of content items in association with other content items can be measured. For example, the content sponsor 122*a* may engage in an advertising campaign including a display advertisement and a keyword advertisement. An experiment can be conducted, for example, by the experiment controller 116, in which the display advertisement is paused in one or more experimental geographical locations and is continued in one or more control experimental locations within a geographic region, while continuing presentation of the keyword advertisement throughout the region. In the present example, the experiment controller 116 can measure conversions (e.g., link clicks) that resolve to a particular resource (e.g., the web page resource 124*a*) that can be directly attributed to a particular content item (e.g., the keyword advertisement) from users in geographic locations where presentation of one or more other content items (e.g., the display advertisement) is paused, and can measure conversions from users in locations where presentation is continued. By comparing conversion rates associated with experimental and control locations, for example, content items (or content item types) that may indirectly assist in the conversion of other content items (or types) may be identified. For example, if the experiment controller 116 determines that conversions of the web page resource 124*a* from the keyword advertisement occur at a higher rate within geographic locations where the display advertisement is continued, relative to conversions within geographic locations where the display advertisement is paused, a degree of lift for the keyword advertisement from the display advertisement may be determined. As another example, similar experiments may be conducted for multiple campaigns and experiment results may be aggregated to identify relationships between various different content types (e.g., display and keyword advertisements).

Content item effectiveness information can optionally be provided (212) based at least in part on the measuring. For example, the campaign information provider 118 can provide effectiveness information associated with a campaign to the content sponsor 122*a*. As another example, aggregated effectiveness information can be generally provided to content sponsors 122 (e.g., to content sponsors that are not necessarily associated with a given experiment) to assist the sponsors in making campaign-related decisions.

Figure 3:
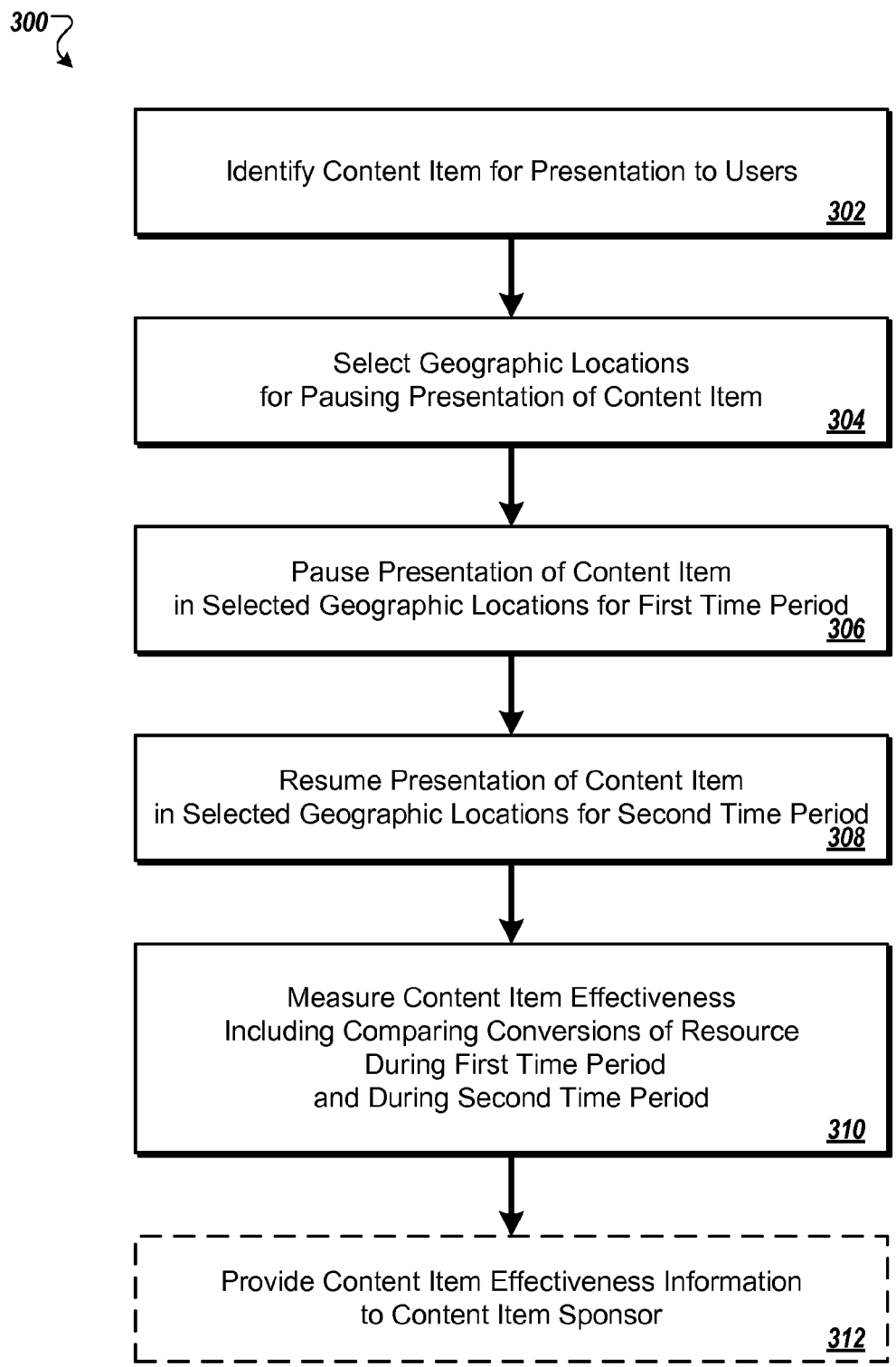

FIG. 3 is a flowchart of an example process 300 for measuring content item effectiveness. In some implementations, the process 300 may be performed by the system 100 (shown in FIG. 1), and will be described as such for the purpose of clarity. Briefly, the process 300 can include identifying a content item for presentation to users, selecting one or more geographic locations for pausing presentation of the content item, pausing presentation of the content item in the selected one or more geographic locations for a first time period, resuming presentation of the content item in the selected one or more geographic locations in a second different time period, measuring content item effectiveness (including comparing conversions of a resource during the first time period and during the second time period), and optionally providing content item effectiveness information to a content item sponsor.

A content item for presentation to users can be identified (302) in response to requests for content. For example, one or more users 104 can employ client computing devices 102 to request content from the computing servers 108. The content item identifier 114, for example, can identify a content item for presentation to users 104 in response to content requests. The content item can be part of a campaign associated with a content item sponsor, and the campaign can be associated with a geographic region. For example, the content sponsor 122*a* may sponsor a campaign including the content item 140*n*, and the campaign may be associated with the geographic region 130.

One or more geographic locations included in the geographic region for pausing presentation of the content item can be selected (304). For example, the experiment controller 116 can determine that presentation of the content item 140*n* is to be paused within the geographic location 132a. Presentation of the content item can be paused (306) in the one or more selected geographic locations for a first time period, and presentation of the content item can be resumed (308) in the one or more selected geographic locations in a second different time period. For example, the experiment controller 116 can pause presentation of the content item 140n within the geographic location 132a during the first time period (e.g., one or more hours, days, weeks, months, etc.) while continuing presentation within geographic locations 132b-132g. At the conclusion of the time period, for example, the experiment controller 116 can resume presentation of the content item 140n within the geographic location 132a.

In some implementations, resuming presentation of the content item may include determining one or more replacement or additional geographic locations for pausing presentation of the content item. For example, during the second time period (e.g., at the conclusion of the first time period), the experiment controller 116 can resume presentation of the content item 140n within the geographic location 130a, and can pause presentation of the content item 140n within the geographic location 130b. Thus, in the present example, content item presentation may be paused in different geographic locations during different time periods, and content item effectiveness can be measured for each of the locations and/or time periods.

Content item effectiveness can be measured (310), including comparing conversions from the resource associated with the content item during the first time period in the one or more geographic locations and conversions associated with the resource associated with the content item during the second different time period. For example, the experiment controller 116 can compare conversions from the web page resource 124a associated with the content item 140n during the first time period (i.e., organic conversions and conversions from the content item 140n) and conversions during the second time period (i.e., organic conversions), in each of the geographic locations 132a-132g within the geographic region 130. As another example, the experiment controller 116 can measure organic conversions for an initial time period, can provide the content item 140n during a subsequent time period, and can compare conversions from the web page resource 124a which occur in each of the time periods. By considering conversions associated with different time periods and/or locations, for example, a degree of lift can be attributed to content items included in a campaign, and the interrelations between content items may be determined.

Content item effectiveness information can optionally be provided (312) based at least in part on the measuring. For example, the campaign information provider 118 can provide effectiveness information associated with a campaign to the content sponsor 122a. As another example, aggregated effectiveness information can be generally provided to content sponsors 122 to assist the sponsors in making campaign-related decisions.

Figure 4:
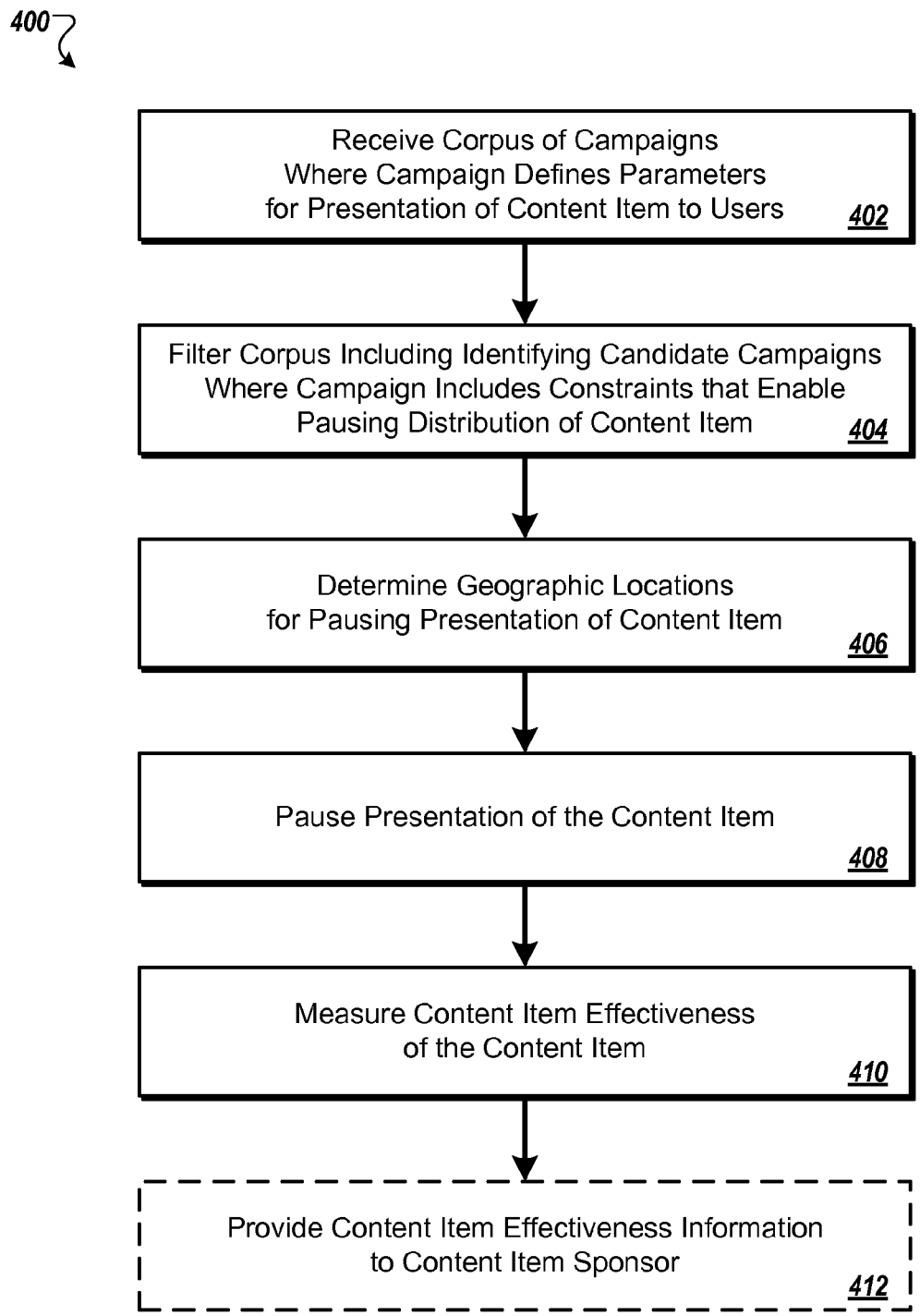

FIG. 4 is a flowchart of an example process 400 for measuring content item effectiveness. In some implementations, the process 400 may be performed by the system 100 (shown in FIG. 1), and will be described as such for the purpose of clarity. Briefly, the process 400 can include receiving a corpus of campaigns, where a campaign defines parameters for presentation of at least one content item to users in response to received content item requests, and filtering the corpus, including identifying candidate campaigns where the campaign includes one or more constraints that permit pausing distribution of the content item. For each candidate campaign, one or more geographic locations for pausing presentation of the content item can be determined, presentation of the content item can be paused, content item effectiveness can be measured, and content item effectiveness information can be provided to a content item sponsor. Various techniques may be used for pausing presentation of the content item and for measuring content item effectiveness. For example, such pausing and measuring techniques may include techniques described above in reference to the process 200 (shown in FIG. 2) and/or the process 300 (shown in FIG. 3).

A corpus of campaigns can be received/identified (402). Each campaign can be associated with at least one content item, the content item including a link to a resource and being associated with a content item sponsor. For example, campaigns provided by content sponsors 122 can be received by the campaign evaluation system 110. One or more campaigns provided by the content sponsor 122a, for example, may include one or more content items (e.g., the content item 140n).

A campaign can define parameters for presentation of the content item to users in response to content item requests. For example, the content sponsor 122a can define parameters for presentation of the content item 140n to users 104. Parameters for presentation may include parameters that specify the circumstances under which a content item may be presented, for example, one or more parameters related to content type and/or context for presentation (e.g., as a keyword advertisement, a display advertisement, etc.), a geographic region for presenting the content item (e.g., within the geographic region 130), a timeframe for presenting the content item (e.g., including a start date and end date), and one or more budget-related parameters (e.g., a number of impressions, spend per impression). In the present example, the content sponsor 122a may indicate that the content item 140n is a keyword advertisement to be displayed in association with a particular keyword (e.g., "hotel"), that the content item 140n is to be provided to users within the geographic region 130, and that the campaign including the content item 140n has a constrained budget (e.g., an amount such as $100,000), with a goal of providing a certain number of impressions (e.g., a number such as 1,000,000 impressions).

The corpus of campaigns can be filtered (404). Filtering the corpus can include identifying one or more candidate campaigns. For example, the campaign filter 112 can filter the corpus of campaigns received by the campaign evaluation system 110. A candidate campaign can be associated with a geographic region and can include one or more constraints that permit pausing distribution of the content item in the campaign in a portion of the geographic region without compromising campaign goals. In some implementations, one or more of the constraints may relate to a number of impressions, and the campaign goals may relate to delivering the number of impressions in the geographic region. For example, the budget constraint (e.g., $100,000 for delivery of 1,000,000 impressions, or $0.10 per impression) associated with the candidate campaign of the content sponsor 122a can be used as a factor in pausing distribution of the content item 140n in a portion of the geographic region 130 without compromising campaign goals (e.g., delivery of 1,000,000 impressions). In general, delivery of the content item 140n in paused portions of the geographic region 130 can be redistributed to other portions in the context of an advertising auction, and accomplishment of campaign goals can be facilitated while gathering data related to the effectiveness of the content item 140n.

In some implementations, filtering the corpus may include filtering out campaigns that do not have a relatively uniform distribution over the geographic region. For example, if a large percentage (e.g., over a threshold percentage such as 50%, 75%, 90%, or another suitable value) of the traffic for a candidate campaign is associated with a small percentage (e.g., under a threshold percentage such as 25%, 10%, 5%, or another suitable value) of geographic locations relative to the overall number of geographic locations within a geographic region, the campaign filter 112 can filter out the candidate campaign. The campaign filter 112, for example, can use an entropy-based test and can measure the distribution of traffic (e.g., clicks) within each of the geographic locations 132a-132g relative to the overall traffic pattern across the geographic region 130. Thus, in the present example, narrowly targeted or local campaigns can be filtered out.

In some implementations, filtering the corpus may include filtering out campaigns that are modified during an experiment. For example, if the content sponsor 122a of a candidate campaign modifies one or more campaign constraints while an experiment including the candidate campaign is in process, the campaign filter 112 can halt the experiment or remove the campaign from the experiment.

For each candidate campaign, one or more geographic locations that are included in the geographic region can be determined (406) for pausing presentation of the content item. The geographic locations may be substantially representative of the geographic region. For example, the experiment controller 116 may determine that the geographic location 132a is substantially representative of the geographic region 130, in terms of being similar in terms of user demographics, user traffic, requests for content, submission of query terms (e.g., "hotel"), or in another appropriate category.

Presentation of the content item can be paused (408) in the one or more geographic locations for a time period. For example, the experiment controller 116 can pause presentation of the content item 140n within the geographic location 132a for one or more hours, days, weeks, months, or on an ongoing basis. By pausing presentation of the content item 140n within a portion of the geographic region 130, for example, presentation of the item may be paused to a portion (e.g., 1%, 5%, 10%, 20%, or another suitable percentage) of the users 102, enabling the accumulation of data from a large and representative group of users for the candidate campaign. By aggregating data from multiple candidate campaigns over extended periods of time, for example, robust experimental data may be accumulated.

In some implementations, a number of geographic locations determined for pausing presentation of the content item may be proportional to a budget constraint of the candidate campaign. For example, if a candidate campaign is subject to a large budget constraint (i.e., a significantly constrained budget) relative to other campaigns, presentation of one or more content items associated with the candidate campaign can be paused within a relatively larger number of geographic locations. If the candidate campaign is under a lesser budget constraint relative to other campaigns, for example, presentation of the content item(s) can be paused within a relatively smaller number of geographic locations. Thus, in the present example, a degree of pausing content item presentation for content item(s) included in a candidate campaign can be controlled such that experimental data is gathered while enabling the campaign to operate within its designated budget.

In some implementations, pausing presentation of the content item may be cycled over different geographic locations for the campaign over time. For example, the experiment controller 116 can pause presentation of the content item 140n within the geographic location 132a during one time period, and within the geographic location 132b during a second, different time period. As another example, when pausing presentation of the content item 140n within the geographic location 132b during the second time period, presentation of the content item 140n within the geographic location 132a can be resumed.

Content item effectiveness of the content item can be measured (410). For example, the experiment controller 116 can measure effectiveness of the content item 140n by measuring direct and indirect conversions of the web page resource 124a by users 104 within paused locations and within unpaused locations. For candidate campaigns including multiple content items (e.g., both keyword advertisements and display advertisements), for example, the experiment controller 116 can pause different item types in different locations, and can measure effectiveness to identify content items and/or types that interact to produce a positive or negative effect on conversions.

In some implementations, measuring content item effectiveness may include comparing a measure of effectiveness of the content item during the time period for one or more paused and one or more unpaused geographic locations. For example, the experiment controller 116 can compare a measure of effectiveness (e.g., conversions of the web page resource 124a) during the time period for the paused geographic location (e.g., geographic location 132a) and for unpaused geographic locations (e.g., geographic locations 132b-132g).

In some implementations, the content item may be presented in a second different time period. For example, the experiment controller 116 can present the content item 140n within the geographic location 132a prior to or after pausing presentation of the content item 140n. Measuring content item effectiveness may include comparing a measure of effectiveness of the content item during the first time period and a measure of effectiveness of the content item during the second different time period. For example, the experiment controller 116 can compare effectiveness information (e.g., conversions of the web page resource 124a) for the geographic location 132a for an experimental period (i.e., the paused period), with effectiveness information for the geographic location 132a for one or more time periods after and/or before the experimental period.

Content item effectiveness information can optionally be provided (412) based at least in part on the measuring. For example, the campaign information provider 118 can provide effectiveness information to one or more content sponsors 122. Effectiveness information relevant to a sponsor of a particular campaign, for example, can be provided to the campaign sponsor. Aggregated information (e.g., information based on general content types) applicable to multiple campaign sponsors, for example, can be provided to the multiple sponsors to assist the sponsors in campaign decision making. In some implementations, content item effectiveness information may be used to adjust the ranking of one or more content items. For example, ranking information associated with a particular content item (e.g., an advertisement) may be used to determine provision or placement of the content item within a resource (e.g., a web page).

Figure 5:
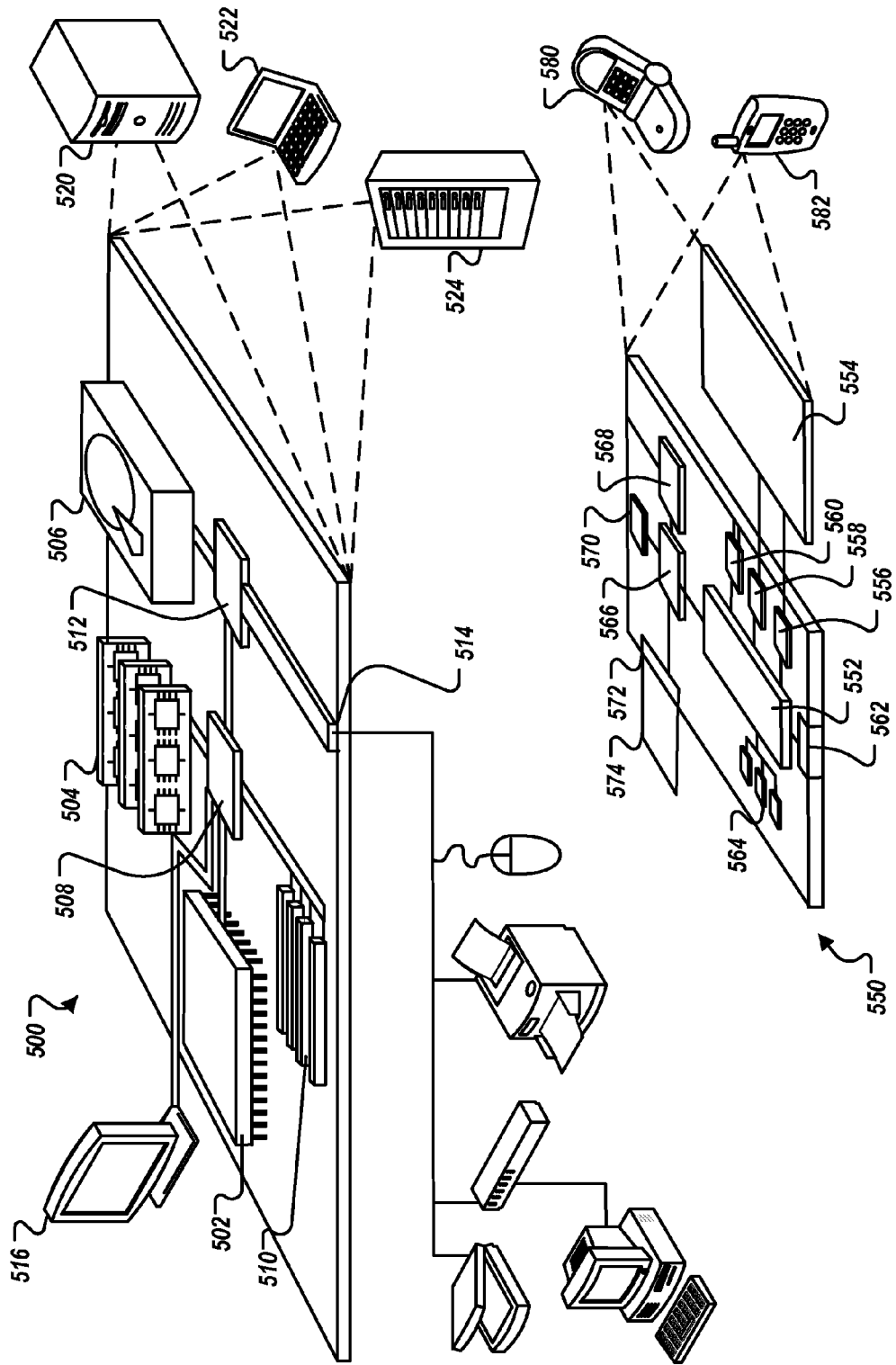
FIG. 5 shows an example of a computer device and a mobile computer device that can be used to implement the techniques described herein.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   identifying a corpus of campaigns, each campaign including constraints, delivery goals and selection criteria for the delivery of one or more associated content items;
   determining, by one or more processors, a candidate campaign from the corpus of campaigns including evaluating constraints associated with delivery of the one or more content items for a first campaign and determining that the constraints include a budget constraint that is sufficient so as to enable the first campaign to be included in an experiment while still enabling the first campaign to meet its respective delivery goals;
   identifying a content item to be presented to users in response to requests for content, the content item including a link to a resource and being part of the first campaign associated with a content item sponsor, the campaign being associated with a geographic region;
   determining a division of the geographic region including identifying a plurality of different geographic locations in the geographic region wherein each geographic location is sufficiently small so as to not consume more than a predetermined percentage of the impressions of the content item for the first campaign;
   selecting one or more of the plurality of different geographic locations to be experimental geographic locations;
   selecting one or more of the plurality of different geographic locations to be control geographic locations;
   pausing presentation of the content item in the one or more experimental geographic locations for a time period, while continuing presentation of the content item in the one or more control geographic locations; and
   measuring content item effectiveness of the content item including comparing conversions associated with the resource during the time period for the one or more experimental geographic locations and conversions associated with the resource during the time period for the one or more control geographic locations.

2. The method of claim 1 where the content item is an advertisement.

3. The method of claim 1 where the resource is a web page.

4. The method of claim 1 where measuring content item effectiveness relates to a hypothetical attribution model that estimates the contributions of impressions of the content item toward conversions associated with the resource.

5. The method of claim 1 where measuring content item effectiveness relates to measuring an effect of a first content item on conversions associated with the resource attributed to a second content item.

6. The method of claim 1 where the one or more experimental geographic locations and the one or more control geographic locations are partitioned from the geographic region such that a majority of users within a particular location spends a majority of their online time within the particular location.

7. The method of claim 1 where the one or more experimental geographic locations are selected based at least in part on being substantially representative of the geographic region.

8. The method of claim 1 further comprising presenting an alternative content item for the time period.

9. The method of claim 1 further comprising providing, to the content item sponsor, content item effectiveness information based at least in part on the measuring.

10. A method comprising:
identifying a corpus of campaigns, each campaign including constraints, delivery goals and selection criteria for the delivery of one or more associated content items;
determining, by one or more processors, a first campaign from the corpus of campaigns including evaluating constraints associated with delivery of the one or more content items for a first campaign and determining that the constraints include a budget constraint that is sufficient so as to enable the first campaign to be included in an experiment while still enabling the first campaign to meet its respective delivery goals;
identifying a content item for presentation to users in response to requests for content, the content item including a link to a resource and being part of the first campaign associated with a content item sponsor, the campaign being associated with a geographic region, the geographic region including one or more geographic locations;
selecting at least one of the one or more geographic locations;
pausing presentation of the content item in the selected at least one of the one or more geographic locations during a first time period;
presenting the content item in the selected at least one of the one or more geographic locations during a second different time period; and
measuring content item effectiveness of the content item including comparing conversions associated with the resource during the first time period and conversions associated with the resource during the second different time period in the selected one or more geographic locations.

11. The method of claim 10 further comprising presenting an alternative content item during the first time period.

12. The method of claim 10 further comprising providing, to the content item sponsor, content item effectiveness information based at least in part on the measuring.

13. A method comprising:
providing a corpus of campaigns, each campaign associated with at least one content item, the at least one content item including a link to a resource and being associated with a sponsor of the content item, where a campaign defines parameters for presentation that specify circumstances under which the at least one content item is presented to users in response to received content item requests and constraints and delivery goals for the at least one content item;
filtering, by one or more processors, the corpus by identifying one or more candidate campaigns in the corpus of campaigns, the filtering including evaluating constraints associated with delivery of the at least one content item for a given campaign and determining that the constraints include a budget constraint that is sufficient so as to enable the given campaign to be included in an experiment while still enabling the given campaign to meet its respective delivery goals, wherein each of the identified one or more candidate campaigns is associated with a geographic region and includes one or more constraints that permit pausing distribution of the content item in the campaign in a portion of the geographic region without compromising delivery goals; and
for each of the identified one or more candidate campaigns,
determining one or more geographic locations that are included in the geographic region, the determined one or more geographic locations being substantially representative of the geographic region;
pausing presentation of the at least one content item in the determined one or more geographic locations for a time period; and
measuring content item effectiveness of the at least one content item during the time period, wherein measuring content item effectiveness includes comparing a measure of effectiveness of the at least one content item during the time period for one or more paused and one or more unpaused geographic locations.

14. The method of claim 13 where filtering the corpus further comprises filtering out campaigns that do not have a relatively uniform distribution over the geographic region.

15. The method of claim 14 further comprising presenting the at least one content item in a second different time period and where measuring content item effectiveness includes comparing a measure of effectiveness of the at least one content item during the first time period and a measure of effectiveness of the at least one content item during the second different time period.

16. The method of claim 14 where pausing presentation of the content item is cycled over different geographic locations for the campaign over time.

17. The method of claim 14 where a number of geographic locations determined for pausing presentation of the content item is proportional to a budget constraint of the candidate campaign.

18. The method of claim 14 where one or more of the constraints relates to a number of impressions and where the campaign goals relate to delivering the number of impressions in the geographic region.

19. The method of claim 14 further comprising providing, to the sponsor of the content item, content item effectiveness information based at least in part on the measuring.

20. A non-transitory computer storage medium encoded with a computer program, the computer program comprising instructions that when executed by one or more computers cause the one or more computers to perform operations comprising:

identifying a corpus of campaigns, each campaign including constraints, delivery goals and selection criteria for the delivery of one or more associated content items;

determining a candidate campaign from the corpus of campaigns including evaluating constraints associated with delivery of the one or more content items for a first campaign and determining that the constraints include a budget constraint that is sufficient so as to enable the first campaign to be included in an experiment while still enabling the first campaign to meet its respective delivery goals;

identifying a content item to be presented to users in response to requests for content, the content item including a link to a resource and being part of a campaign associated with a content item sponsor, the campaign being associated with a geographic region;

determining a division of the geographic region including identifying a plurality of different geographic locations in the geographic region wherein each geographic location is sufficiently small so as to not consume more than a predetermined percentage of the impressions of the content item for the first campaign;

selecting one or more of the plurality of different geographic locations to be experimental geographic locations;

selecting one or more of the plurality of different geographic locations to be control geographic locations;

pausing presentation of the content item in the one or more experimental geographic locations for a time period, while continuing presentation of the content item in the one or more control geographic locations; and measuring content item effectiveness of the content item including comparing conversions associated with the resource during the time period for the one or more experimental geographic locations and conversions associated with the resource during the time period for the one or more control geographic locations.

21. A campaign evaluation system comprising:
one or more computer processors;
computer memory storing a computer program, wherein the computer program includes a campaign filterer, a content item identifier, an experiment controller, and a campaign information provider, which, when executed by the one or more computer processors, performs a method, the method comprising:
  identifying a corpus of campaigns, each campaign including constraints, delivery goals and selection criteria for the delivery of one or more associated content items;
  determining, by one or more processors, a candidate campaign from the corpus of campaigns including evaluating constraints associated with delivery of the one or more content items for a first campaign and determining that the constraints include a budget constraint that is sufficient so as to enable the first campaign to be included in an experiment while still enabling the first campaign to meet its respective delivery goals;
  identifying a content item to be presented to users in response to requests for content, the content item including a link to a resource and being part of the first campaign associated with a content item sponsor, the campaign being associated with a geographic region;
  determining a division of the geographic region including identifying a plurality of different geographic locations in the geographic region wherein each geographic location is sufficiently small so as to not consume more than a predetermined small percentage of the impressions of the content item for the first campaign;
  selecting one or more of the plurality of different geographic locations to be experimental geographic locations;
  selecting one or more of the plurality of different geographic locations to be control geographic locations;
  pausing presentation of the content item in the one or more experimental geographic locations for a time period, while continuing presentation of the content item in the one or more control geographic locations; and
  measuring content item effectiveness of the content item including comparing conversions associated with the resource during the time period for the one or more experimental geographic locations and conversions associated with the resource during the time period for the one or more control geographic locations.

22. A campaign evaluation system comprising:
one or more computer processors;
computer memory storing a computer program, wherein the computer program includes a campaign filterer, a content item identifier, an experiment controller, and a campaign information provider, which, when executed by the one or more computer processors, performs a method, the method comprising:
  identifying a corpus of campaigns, each campaign including constraints, delivery goals and selection criteria for the delivery of one or more associated content items;
  determining, by one or more processors, a first campaign from the corpus of campaigns including evaluating constraints associated with delivery of the one or more content items for a first campaign and determining that the constraints include a budget constraint that is sufficient so as to enable the first campaign to be included in an experiment while still enabling the first campaign to meet its respective delivery goals;
  identifying a content item for presentation to users in response to requests for content, the content item including a link to a resource and being part of the first campaign associated with a content item sponsor, the campaign being associated with a geographic region, the geographic region including one or more geographic locations;
  selecting at least one of the one or more geographic locations;
  pausing presentation of the content item in the selected at least one of the one or more geographic locations during a first time period;
  presenting the content item in the selected at least one of the one or more geographic locations during a second different time period; and
  measuring content item effectiveness of the content item including comparing conversions associated with the resource during the first time period and conversions associated with the resource during the second different time period in the selected one or more geographic locations.

23. A campaign evaluation system comprising:
one or more computer processors;
computer memory storing a computer program, wherein the computer program includes a campaign filterer, a content item identifier, an experiment controller, and a campaign information provider, which, when executed by the one or more computer processors, performs a method, the method comprising:

providing a corpus of campaigns, each campaign associated with at least one content item, the at least one content item including a link to a resource and being associated with a sponsor of the content item, where a campaign defines parameters for presentation that specify circumstances under which the at least one content item is presented to users in response to received content item requests and constraints and delivery goals for the at least one content item;

filtering, by one or more processors, the corpus by identifying one or more candidate campaigns in the corpus of campaigns, the filtering including evaluating constraints associated with delivery of the at least one content item for a given campaign and determining that the constraints include a budget constraint that is sufficient so as to enable the given campaign to be included in an experiment while still enabling the given campaign to meet its respective delivery goals, wherein each of the identified one or more candidate campaigns is associated with a geographic region and includes one or more constraints that permit pausing distribution of the content item in the campaign in a portion of the geographic region without compromising delivery goals; and for each of the identified one or more candidate campaigns,
  determining one or more geographic locations that are included in the geographic region, the determined one or more geographic locations being substantially representative of the geographic region;
  pausing presentation of the at least one content item in the determined one or more geographic locations for a time period; and
  measuring content item effectiveness of the at least one content item during the time period, wherein measuring content item effectiveness includes comparing a measure of effectiveness of the at least one content item during the time period for one or more paused and one or more unpaused geographic locations.

* * * * *